(12) United States Patent
Takekuma et al.

(10) Patent No.: US 6,507,700 B1
(45) Date of Patent: Jan. 14, 2003

(54) WATERPROOF CAMERA

(75) Inventors: Hironobu Takekuma, Yokohama (JP); Masami Takahashi, Zushi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/901,051

(22) Filed: Jul. 10, 2001

(30) Foreign Application Priority Data

Jul. 10, 2000 (JP) .......................................... 2000-208869
Jul. 6, 2001 (JP) .......................................... 2001-206885

(51) Int. Cl.[7] .............................................. G03B 17/08
(52) U.S. Cl. ........................................... 396/25; 348/81
(58) Field of Search .............................. 396/25, 26, 27, 396/28, 29; 348/81, 82, 84, 85, 373

(56) References Cited

U.S. PATENT DOCUMENTS 4,295,721 A * 10/1981 Rebikoff ...................... 396/26
4,724,448 A * 2/1988 Maeda et al. ................. 396/29

FOREIGN PATENT DOCUMENTS

JP          9-265035         10/1997

* cited by examiner

*Primary Examiner*—David M. Gray
(74) *Attorney, Agent, or Firm*—Connolly Bove Lodge & Hutz LLP (57) ABSTRACT

A waterproof camera has a waterproofing camera case (front and rear cases) and a lens barrel secured within the camera case. Within the lens barrel, there is formed a lens-containing space communicating to a front opening thereof. A group of lenses for wide-angle imaging are arranged in the space. A front lens of the lenses is placed to cover the opening, so that the front lens serves in common as a sealing member. An annular protrusion of tip of the lens barrel is caulked inside by thermal welding. An O-ring is inserted between an outer cylindrical surface of the front lens and an inner wall cylindrical surface of the lens barrel. Another O-ring is inserted between an outer cylindrical surface of tip of the lens barrel and an inner cylindrical surface of tip of the front case.

11 Claims, 7 Drawing Sheets

WATERPROOF CAMERA

BACKGROUND OF THE INVENTION

1. Field of the Invention

The present invention relates to a waterproof camera that has a waterproof function for the camera case, and in particular, to a waterproof camera suitable for wide-angle cameras which need a large range of view and which have applications, for example, as on-vehicle monitors or industrial monitors.

2. Description of the Related Art

There have been known waterproof cameras that have the waterproof function so that they can be used outdoors or in an environment with much moisture. In recent years, jointly with improvement in performances of imaging and miniaturization, the waterproof cameras are used mainly in on-vehicle and industrial applications.

In such waterproof cameras, one waterproof structure that has been used frequently in the past uses a protective case that contains a camera therein. In this structure, a waterproof function is obtained by sealing with a flat glass an opening formed in the objective-side front of the protective case. However, when applying the waterproof function using this protective case to a wide-angle camera, there is a problem that the angle of incidence light to the wide-angle camera contained in the protective case narrows in response to restrictions by the range of the flat glass. Securing a large angle of incidence of light needs a large flat glass. Accordingly, the wide-angle camera will result in a large scale as a whole.

Another waterproof structure is disclosed by Japanese Patent Laid-open Publication No. 9-265035. The waterproof technology given in this publication is related with a waterproof structure of the lens barrel of a lens-shutter type of camera. Specifically, of a group of front lenses, the periphery section of a lens located at the front end is pressed onto an annular abutting surface of a lens pressure ring, with a coating member inserted therebetween. This eliminates the necessity of using a conventional protective glass arranged in the front of the camera.

Then, it is conceivable to carry out the waterproof structure disclosed by the above publication toward a wide-angle camera. That is, it could be possible that the disclosed waterproof structure be applied to the first lens located at the objective-side front of a plurality of lenses of a wide-angle camera.

However, in the case of the waterproof structure disclosed by the above-mentioned publication, a lens pressure ring is screwed to the periphery section of the first lens located at the objective-side front. The lens barrel is required to extend along its axial direction. Hence, the extended portion and lens pressure ring will become obstacles over the incidence angle to the first lens. As a result, like the flat glass of the protective case, there still remains a conflicting problem between securing a wide angle of incidence of light and miniaturizing a camera.

Moreover, the waterproof structure disclosed by the above-mentioned publication is directed to the waterproof of interior of a lens barrel. Thus, for applying such waterproof structure to a camera in which both lens barrel and constituents of an imaging system, such as a solid-state image sensor, are disposed within the protective case, another waterproof structure has to be given the constituents of the imaging system. Consequently, the simplification and miniaturization of the structure of the camera itself are difficult after all.

SUMMARY OF THE INVENTION

The present invention has been made to overcome the above difficulties, and an object of the present invention is to provide a waterproof camera with its simplified internal structure, its compact entire size, and a wide range of view to a lens system.

To realize the above object, as one aspect of the present invention, there is provided a waterproof camera comprising: a group of wide-angle lenses including a first lens and one or more remaining lenses; a camera case having a front opening is formed in a front thereof and the front opening being shielded with the first lens; and a lens barrel being fixed in the camera case and containing the remaining lenses fixed therein.

By way of example, one end of the lens barrel is integrated with a bottom of the front opening of the camera case.

As another aspect, the present invention provides a waterproof camera comprising: a group of wide-angle lenses including a first lens and one or more remaining lenses; a camera case having a front opening formed in a front thereof; and a lens barrel having a further front opening formed in a front thereof, wherein the lens barrel contained in the camera case so that the lens barrel seals the front opening of the camera case and the further opening of the lens barrel is sealed with the first lens and the remaining lenses are contained within the lens barrel.

Therefore, the waterproof camera of which inside is air-tightly sealed is provided, with the front lens formed in the front. The waterproof camera is made compact in size, relatively simplified in the internal structure, and suitable for wide-angle imaging.

Still another aspect of the present invention, there is a waterproof camera comprising: a waterproof camera case in a front of which a first opening is formed; a lens barrel being fixed within the camera case, in a front of which a second opening is formed, and in which a lens-containing space communicated to the second opening is formed; and a group of lenses being disposed in the lens-containing space and consisting of a plurality of lenses including a first lens, wherein the first lens is located over the second opening of the lens barrel and a circumferential edge of the second opening of the lens barrel is sealed with a peripheral of the first lens.

Accordingly, with the front lens located at the front opening, the sealing is steadily accomplished between the front lens and the lens barrel. Therefore, in addition to being used for imaging, the first lens works as well as a protective glass conventionally used. Since such a protective member is unnecessary, the camera is made compact in size and structure as a whole. Because the front lens is located at the frontmost row of the camera, a wider range of view to the lenses can be secured, being preferable for wide-angle imaging. It is enough that the lenses are fabricated in only the lens barrel, so that the internal structure of the camera is also simplified.

It is preferred that the first lens has a circumferential side surface intersecting with a radial direction of the first lens and a first step part presenting a step-like change in cross section in an optical axis direction of the first lens, the lens barrel having a second step part presenting a step-like change in section in the optical axis direction, and a sealing member is disposed in the radial direction between the first and second step parts.

Accordingly, the sealing member shows an excellent sealing performance against wind and rain between the first lens and the lens barrel. Stress with this sealing is mostly caused in the radial direction of the lens. Giving the front lens a specified amount of strength enables the first lens to absorb the stress without any deformation. In other words, the occasion in which the stress occurs in the direction of an optical axis is avoided surely. Therefore, because the stress will not influence on, for example, a CCD substrate of an imaging unit, there is no distortion in the substrate, resulting in that deteriorations in image quality due to such stress can be avoided without fail.

It is also preferable that the lens barrel has a third step part presenting a step-like change in section in the optical axis direction, the third step part being formed on an outer circumferential surface of a tip of the lens barrel, the camera case has a fourth step part presenting a step-like change in section in the optical axis direction, the fourth step part being formed on an inner circumferential surface of a wall forming the first opening of the camera case, and a further sealing member is disposed in the radial direction between the third and fourth step parts.

Accordingly, the further sealing member shows an excellent sealing performance against wind and rain between the lens barrel and the camera case. In this sealing, like the foregoing sealing, stress that might cause deteriorations in image quality can be avoided from occurring in the direction of the optical axis.

Preferably, the lens barrel is made of resin and has a protrusion in section at a circumferential edge of the lens barrel, wherein the protrusion is caulked by thermal welding so that the protrusion covers a peripheral of a front of the first lens. Still preferably, the group of lenses has an angle of view for wide-angle imaging.

DESCRIPTION OF THE PREFERRED EMBODIMENTS

Various embodiments of a waterproof camera according to the present invention will now be explained with reference to the accompanying drawings.

In the following embodiments, as a camera having a waterproof function (that is, a waterproof camera), a wide-angle imaging camera of which range of view is wide (hereinafter, simply referred to as a wide-range camera) is adopted. Such wide range of view is attained, for example, by setting an angle of view of some 130 degrees in the horizontal direction and an angle of view of some 95 degrees in the vertical direction. Moreover, the wide-angle camera according to the following embodiments adopts a solid-state image sensor receiving light condensed by lenses, and then an output signal from the solid-state image sensor is processed for providing images. However, the waterproof structure of the waterproof camera according to the present invention is not limited to the wide-angle camera mentioned above, but may be a telephoto camera. Moreover, the imaging method available for the waterproof camera according to the present invention may be a lens-shutter method.

First Embodiment

Figure 1:
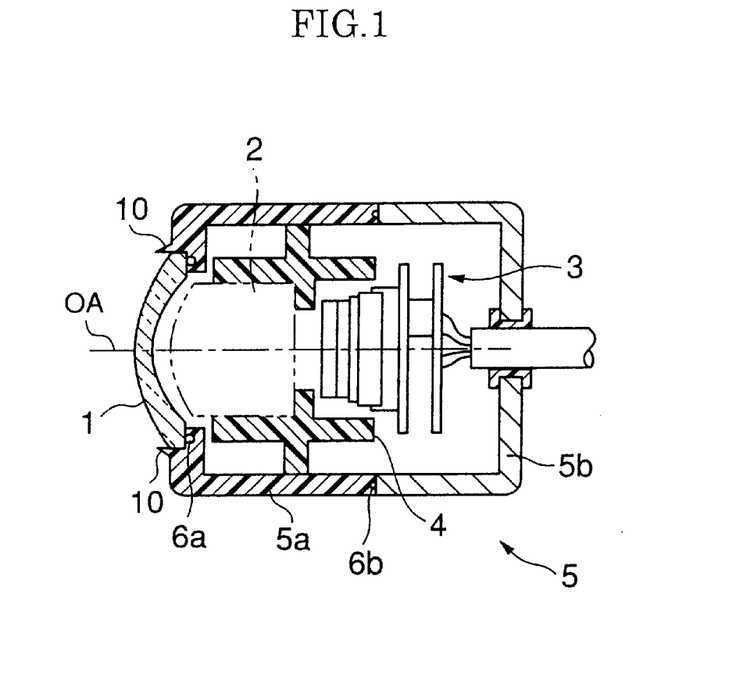
FIG. 1 is an outlined sectional view showing a waterproof camera according to a first embodiment of the present invention.
Figure 2:
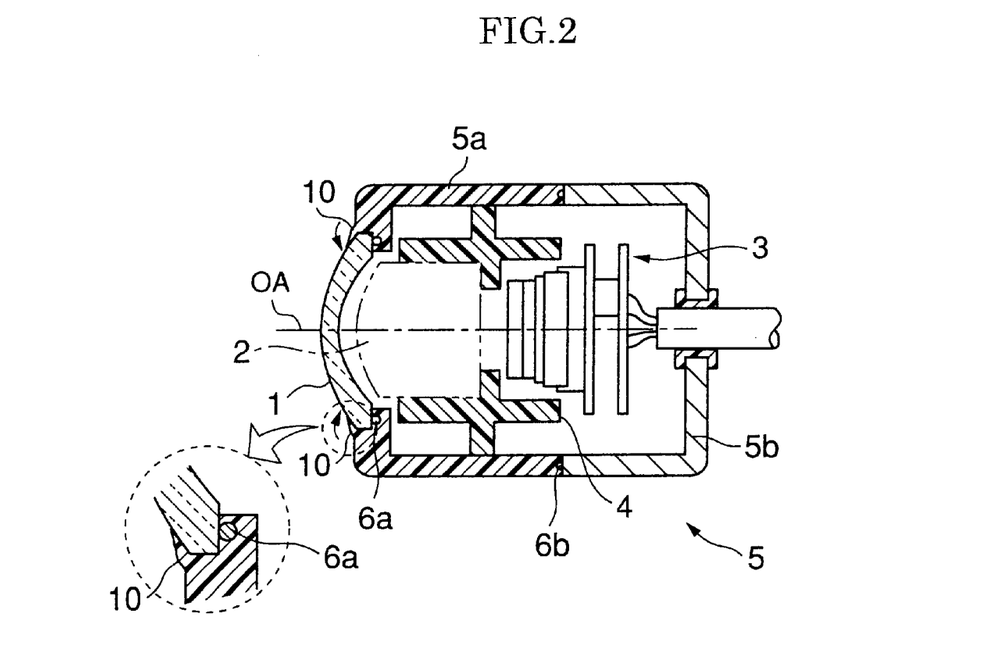
FIG. 2 is an outlined sectional view showing a sealed state of the waterproof camera by caulking a protrusion thereof.

A waterproof camera according to a first embodiment is explained based on FIGS. 1 and 2.

FIG. 1 shows an outlined section of the waterproof camera and FIG. 2 shows an outlined section explaining a waterproof structure of the waterproof camera.

In the first embodiment, a plurality of lenses make up of a group of wide-angle lenses. Of a plurality of lenses, the first lens (hereinafter, called as a front lens) 1 located at the front row near an objective in the direction of an optical axis OA is also used to seal a front opening of a camera case 5.

Specifically, as shown in FIG. 1, in the space communicating from an opening of the front of the camera case 5 to its inside, there are disposed the front lens 1 and a group of remaining lenses 2 which are counted from the second one, and an imaging unit 3 having a CCD (Charge Coupled Device). All of the first to last lens make up of a group of wide-angle lenses, which align from the objective side along the optical axis OA. The camera case 5 is divided into a front case 5a and a rear case 5b. In the front of the front case 5a, an opening for attaching the front lens 1 is formed. Both of a circumferential side surface of the front lens 1 and the opening of the front case 5a are formed so that they can be fitted to each other in the direction of the optical-axis OA. A rear-end surface of the front lens 1 is formed so as to be abutted on a front-end surface of the front case 5a. Along an annular circumferential edge that forms the opening of front case 5a, an annular protrusion 10 which can be caulked (thermally deformed) inside by thermal welding is formed.

In this embodiment, the front case 5a is formed of resin material, but the type of material is not especially limited to such a material.

As shown in FIG. 2, an annular rubber washer 6a is arranged between the rear-end surface of the front lens 1 and the front-end surface of the front case 5a. With this rubber washer 6a pressed, caulking the protrusion 10 inside by the thermal welding seals air-tightly the front opening of the camera case 5. The group of remaining lenses 2 starting from the second one are disposed in a lens barrel 4. The lens barrel 4 is attached in the front case 5a. Moreover, the imaging unit 3 is attached in the lens barrel 4. The front case 5a and rear case 5b are combined by screws (not shown) through another rubber washer 6b.

Figure 3:
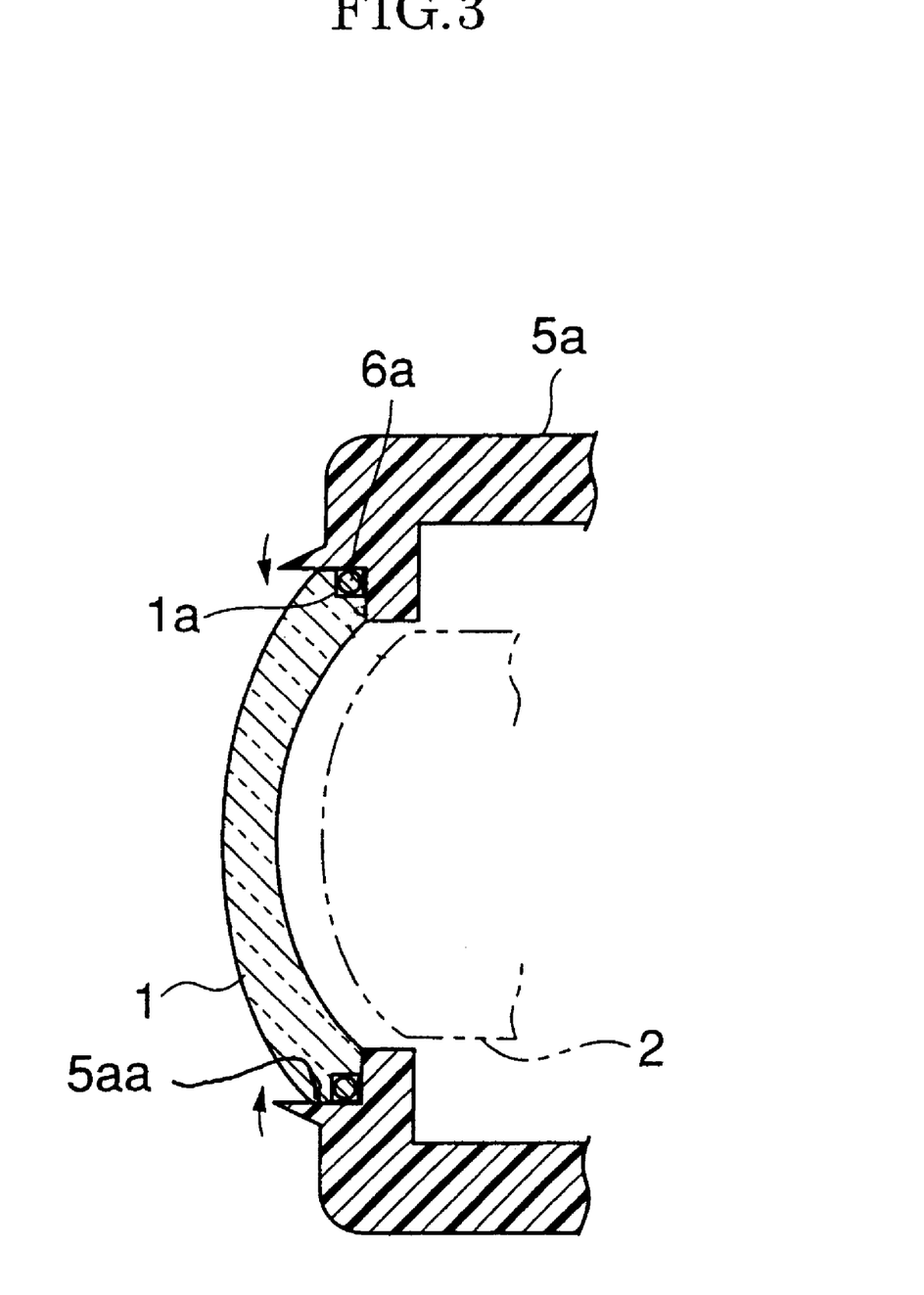
FIG. 3 is an outlined partial sectional view showing a modification of a sealing structure between a front lens and a front case.

In addition, the waterproof structure by using the rubber washer can be modified as shown in FIG. 3. That is, a step part 1a is formed on an outer circumferential surface of the front lens 1, a rubber washer is placed on the step part 1a, and the rubber washer 6a is pressed by a lens fitting surface 5aa of the front case 5a (this fitting structure is called a cylindrical-surface-based fitting structure). Thereby, when caulking the protrusion 10 inside in the radial direction by thermal welding, a thrust acting forward and pushing the front lens 1 in the direction of the optical axis will not be produced, unlike the so-called flat-surface-based fitting structure shown in FIG. 1. For this reason, the stable operation of the thermal welding can be done efficiently.

Figure 4:
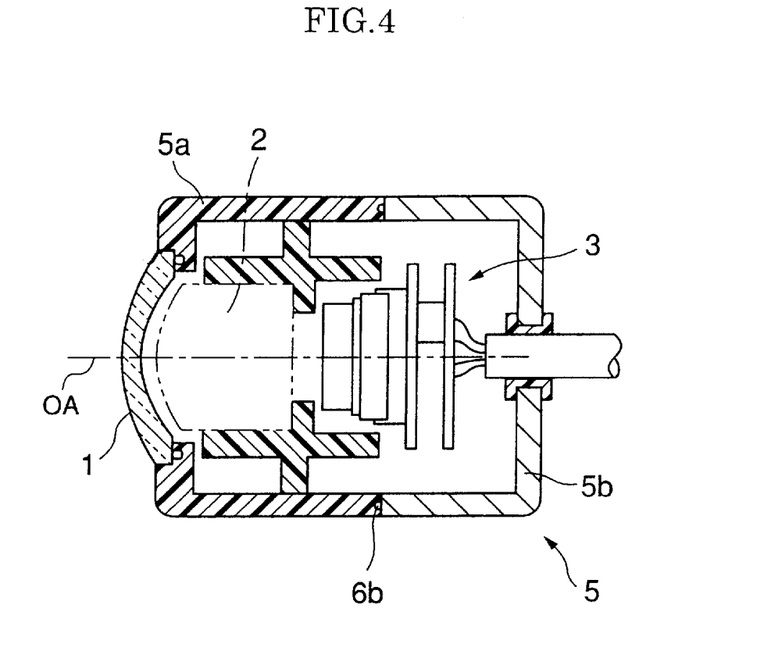
FIG. 4 is an outlined sectional view showing a modification according to the waterproof camera in FIG. 1.
Figure 5:
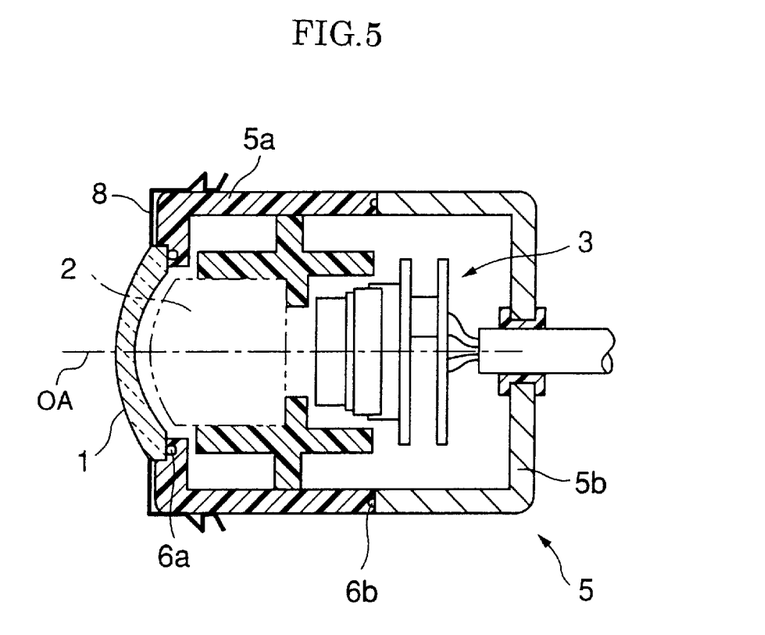
FIG. 5 is an outlined sectional view showing another modification according to the waterproof camera in FIG. 1.

Instead of the above-mentioned thermal welding, as in a modification shown in FIG. 4, the circumferential side surface of the front lens 1 is attached onto the front opening of the front case 5a and is attached with an adhesive thereto, with a gap between them sealed. Further, as another modification, as shown in FIG. 5, an annular rubber washer 6a is inserted between the rear-end surface of the front lens 1 and the front-end surface of the front case 5a, and a pressure fitting 8 drives the front lens 1 backward in the direction of the optical axis OA so that the rubber washer 6a is pressed.

Second Embodiment

Figure 6:
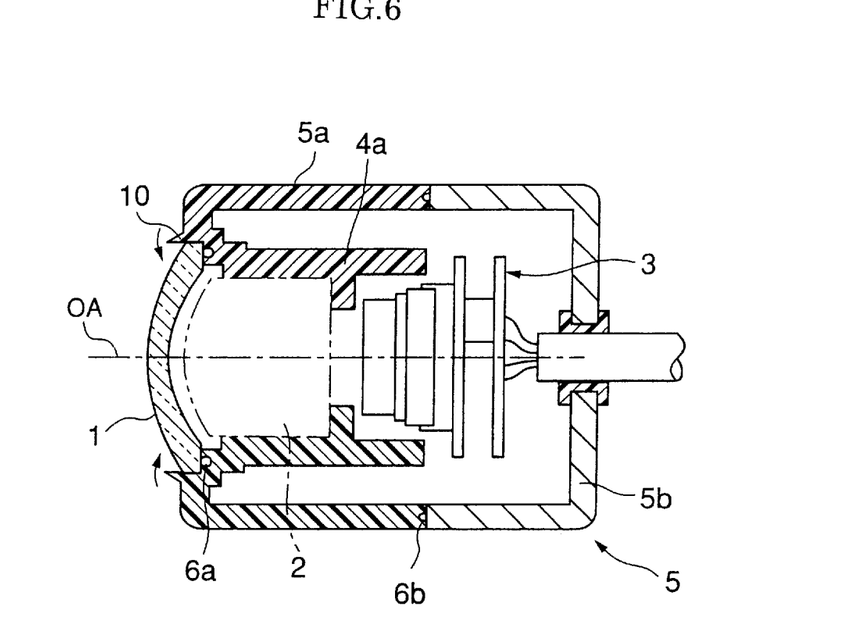
FIG. 6 is an outlined sectional view showing a waterproof camera according to a second embodiment of the present invention.

With reference to FIG. 6, a second embodiment of the waterproof camera according to the present invention will now be explained.

In the second embodiment, a lens barrel 4a is connected with the front case 5a at the front of the front case 5a, thus being formed into one member. The circumferential side surface of the front lens 1 and the front opening of the lens barrel 4a are made to fit to each other in the direction of the optical axis OA. The rear-end surface of the front lens 1 is formed so that it abuts on the front-end surface of the lens barrel 4a. The annular rubber washer 6a is inserted between the rear-end surface of the front lens 1 and the front-end surface of the lens barrel 4a, then the protrusion 10 is caulked inside by thermal welding, with the rubber washer 6a compressed This accomplishes the airtight sealing for the front opening of the lens barrel 4a. In this embodiment, although the front case 5a and lens barrel 4a are formed with resin material, they are not especially limited to such a material.

The remaining construction is the same as that of the first embodiment.

In addition, as one modification of the second embodiment, available is the waterproof construction using the rubber washer 6a, like the construction shown in FIG. 3. Specifically, the step part 1a is formed on the outer circumferential surface, and the rubber washer 6a is placed on the step part 1a so that it is pressed with the lens fitting surface 5aa of the front case 5a, providing the cylindrical-surface-based fitting structure (refer to FIG. 3). This makes it possible that the work of the thermal welding toward the protrusion 10 is carried out with a stable and efficient manner.

Further, as other modifications of the second embodiment, the technique with the adhesive, which is shown in FIG. 4, and the technique with the pressure fitting 8, which is shown in FIG. 5, are also used to provide the air-tight waterproof construction.

Third Embodiment

Figure 7:
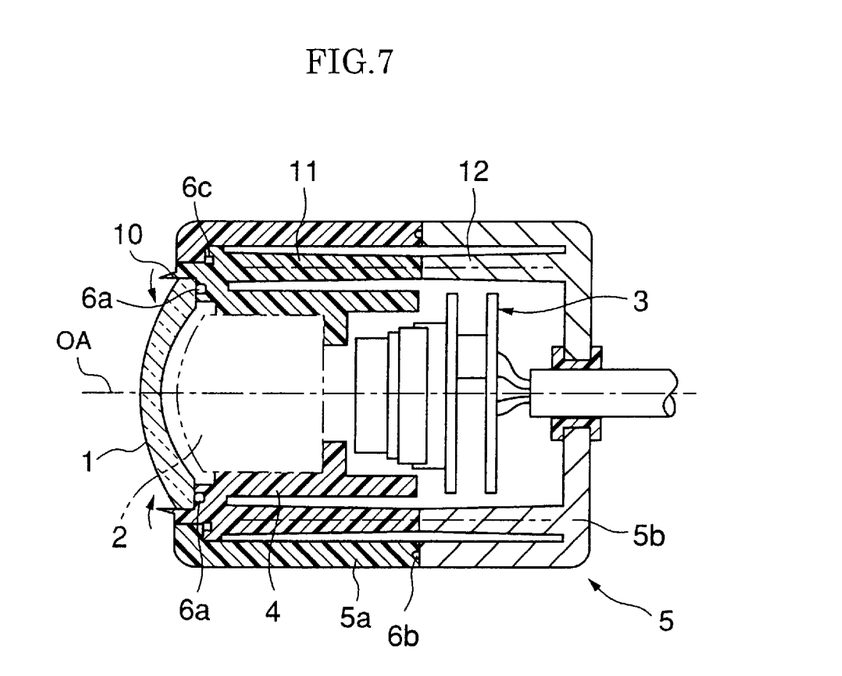
FIG. 7 is an outlined sectional view showing a waterproof camera according to a third embodiment of the present invention.

With reference to FIG. 7, a third embodiment according to the waterproof camera of the present invention will be explained.

In the waterproof camera of this embodiment, as shown in FIG. 7, the lens barrel 4 is formed independently of the camera case 5. Both of the front lens 1 and a group of remaining lenses 2 beginning from the second lens are attached to the lens barrel 4. The annular rubber washer 6a is inserted between the rear-end surface of the front lens 1 and the front-end surface of the lens barrel 4, and the protrusion 10 is caulked inside by thermal welding so as to press the rubber washer 6a. The sealing of the front opening of the lens barrel 4 is carried out air-tightly.

On the lens barrel 4 and rear case 5b, hollow-shaped cylindrical bosses 11 and 12 are formed, respectively, in such a manner that the bosses are abutted on each other in the direction of the optical axis OA.

A rubber washer 6c is arranged between the rear-end surface of the front case 5a and the front-end surface of the lens barrel 4. The boss 12 of the rear case 5b is pressed onto the boss 11 of the lens barrel 4, and then both of the front and rear cases 5a and 5b are fitted together with screws (not shown). This fitting enables the camera case 5 to be sealed airtightly thanks to the compressed rubber washer 6c. In this embodiment, although the lens barrel 4 is formed with resin material, it is not especially limited to such material.

The other constructions are the same as those in the first embodiment.

Figure 8:
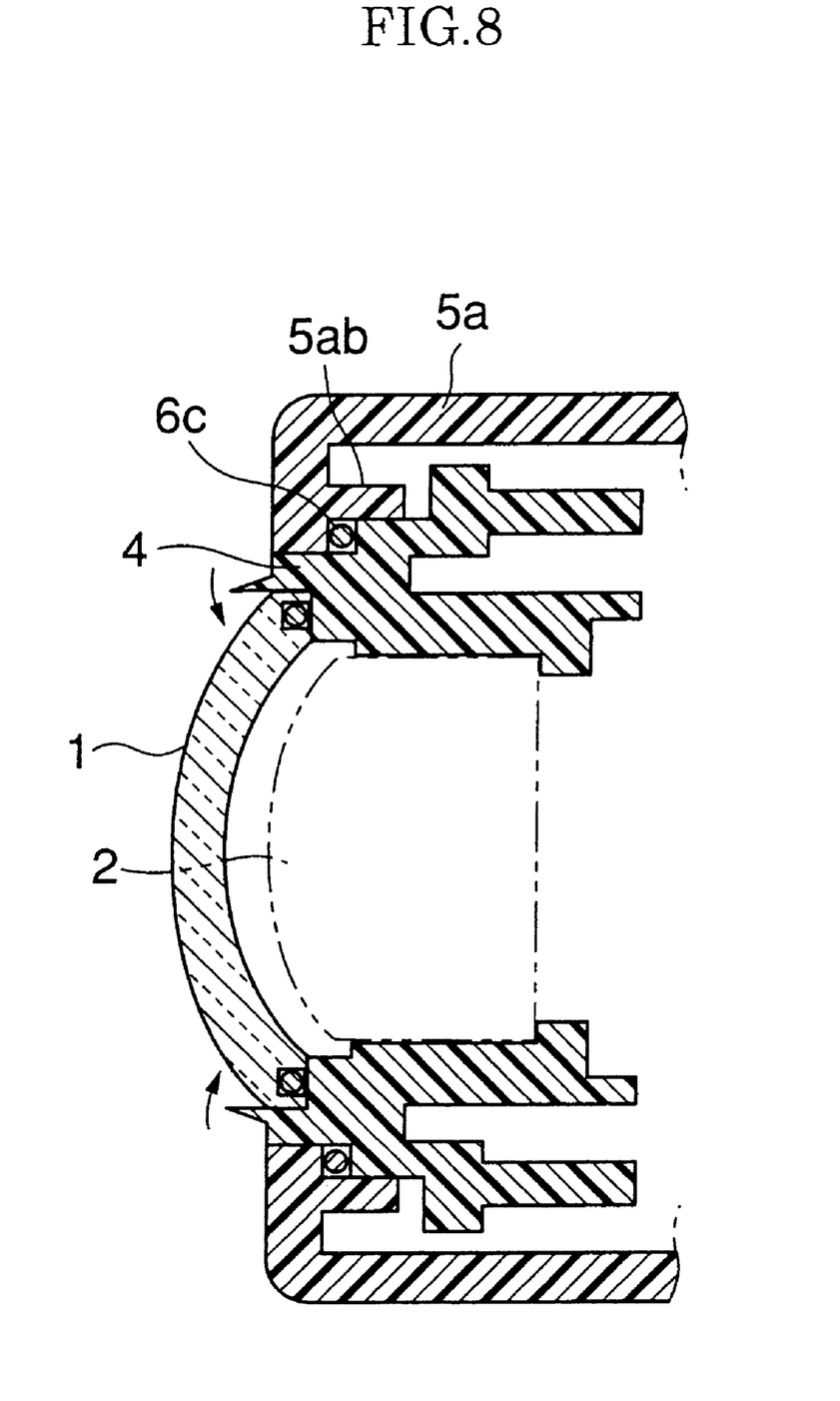
FIG. 8 is an outlined partial sectional view showing a modification of a waterproof structure between a lens barrel and a front case.

In addition, in the waterproof camera of this third embodiment, there can be provided a modification shown in FIG. 8, in which the waterproof structure between the front case 5a and the lens barrel 4 is realized by the cylindrical-surface-based fitting structure. This waterproof structure uses a rib 5ab built as one unit on the inner front wall of the front case 5a along the direction of the optical axis OA. This rib 5ab touches the outer circumference of the rubber washer 6c. That is, the outer circumferential surface of tip of the lens barrel 4 and the inner circumference surface of the rib 5ab of the front case 5a are fixed together through the rubber washer 6c in an airtight state.

Fourth Embodiment

Figure 9:
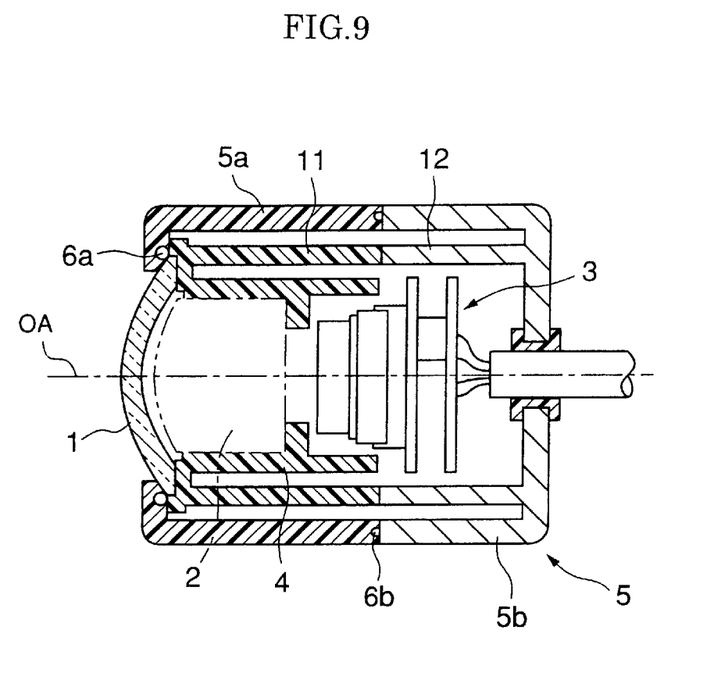
FIG. 9 is an outlined sectional view showing a waterproof camera according to a fourth embodiment of the present invention.

With reference to FIG. 9, a fourth embodiment according to the waterproof camera of the present invention wilt now be explained.

In this fourth embodiment, the lens barrel 4 is formed independently of the camera case 5, like the third embodiment. Both of the front lens 1 and the group of remaining lenses 2 starting from the second lens are attached to the lens barrels 4. The front lens 1 is attached to the front opening of the lens barrel 4 through an adhesive.

On the lens barrel 4 and rear case 5b, hollow-shaped cylindrical bosses 11 and 12 are formed, respectively, in such a manner that the bosses are abutted on each other in the direction of the optical axis OA. A rubber washer 6a is arranged between the rear-end surface of the front case 5a and the front lens 1. The boss 12 of the rear case 5b is pressed onto the boss 11 of the lens barrel 4, and then both of the front and rear cases 5a and 5b are fitted together with screws (not shown). This fitting enables the camera case 5 to be sealed air-tightly thanks to the compressed rubber washer 6a. The other constructions are the same as those in the first embodiment.

In addition, as shown in FIG. 3, the waterproof construction using the rubber washer 6a can be realized by the cylindrical-surface-based fitting structure already explained.

Fifth Embodiment

Figure 10:
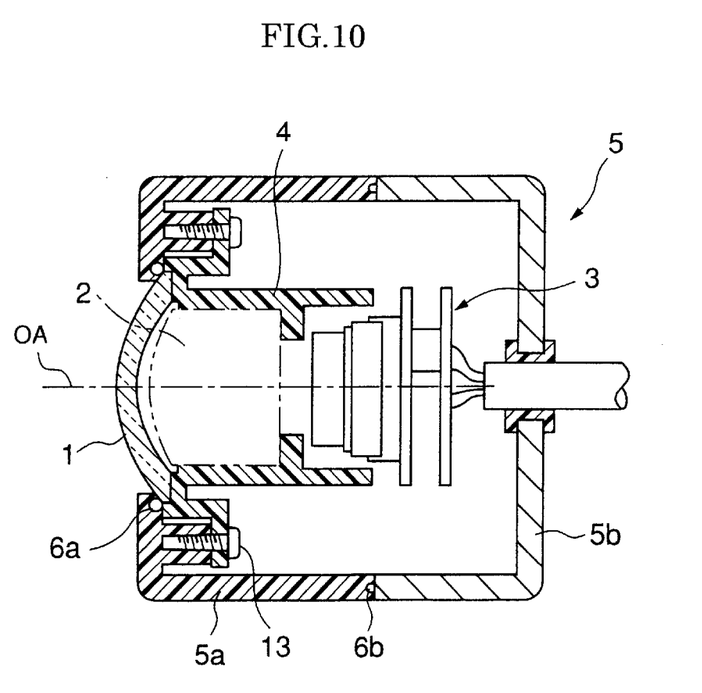
FIG. 10 is an outlined sectional view showing a waterproof camera according to a fifth embodiment of the present invention.

With reference to FIG. 10, a fifth embodiment of the waterproof camera according to the present invention will now be explained.

In this fifth embodiment, like the third and fourth embodiments, the lens barrel 4 is formed independently of the camera case 5. Both of the front lens 1 and the group of remaining lenses 2 starting from the second lens are attached to the lens barrels 4. The front lens 1 is attached to the front opening of the lens barrel 4 through an adhesive.

The rubber washer 6a is arranged between the rear-end surface of the front case 5a and the front-end surface of the front lens 1. The lens barrel 4 is fastened to the front case 5a with screws 13. Thus, the rubber washer 6a can be compressed to seal the case 5.

Sixth Embodiment

Figure 11:
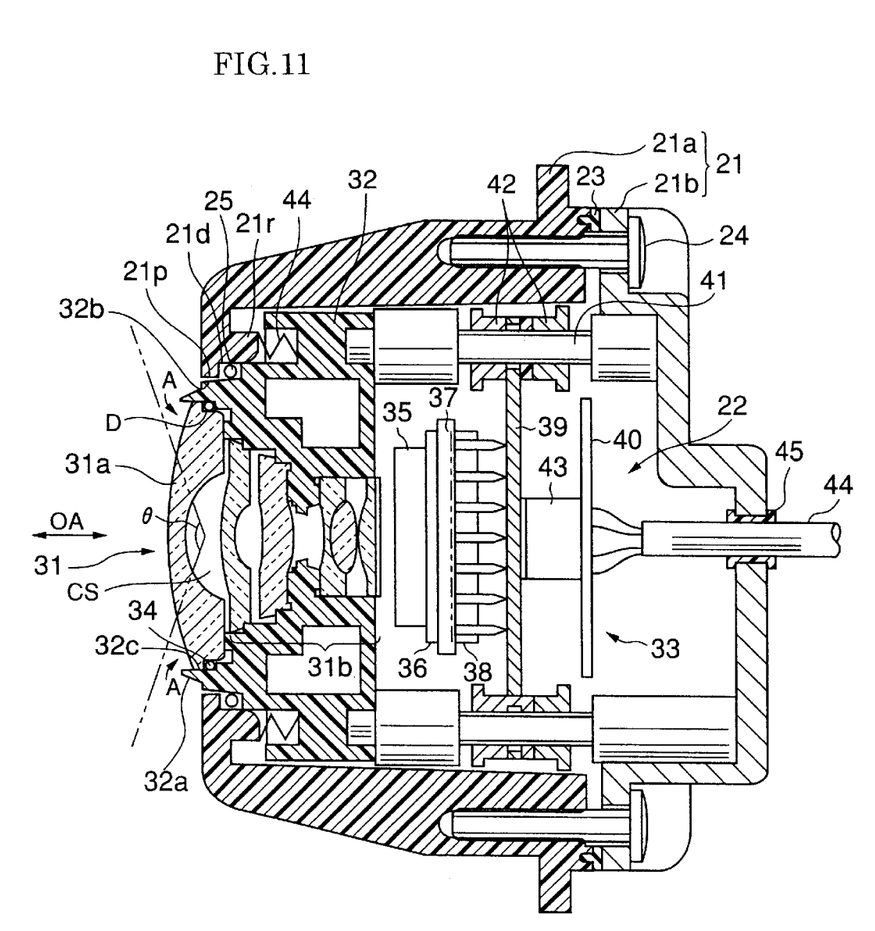
FIG. 11 is an outlined sectional view showing a waterproof camera according to a sixth embodiment of the present invention.

With reference to FIG. 11, a sixth embodiment of the waterproof camera according to the present invention will now be explained.

This waterproof camera is further developed in the waterproof structure from that shown in the third embodiment. That is, the waterproof structure between a front lens and a lens barrel and the waterproof structure between the lens barrel and a front case are both realized by the cylindrical-surface-based fitting structure.

As shown in FIG. 11, this waterproof camera is equipped with a camera case 21 formed into an approximately box-like shape and an imaging unit 22 contained in this camera case 21.

The camera case 21 is equipped with a front case 21a located near an object to be imaged and a rear case 21b coupled to the back of the front case 21a. The rear case 21b is combined with a rear-end surface of the front case 21a with screws 24 arranged at predetermined positions through a square annular sealing washer 23. With this washer 23, both of the front case 21a and the rear case 21b are sealed on each other, thus providing a waterproof function.

In the present embodiment, the front case 21a is made of resin material, such as PPA (polyphthalamide). On the other hand, the rear case 21b is formed with metal material, such as aluminum. However, materials of both cases 21a and 21b are not limited to such materials.

An opening 21p is formed in the front of the front case 21a. As will be described later, the opening 21p holds a head of the imaging unit 22 in a sealed state for waterproof and part of the head is made to slightly expand outside from the opening 21p. At the circumferential end of the opening 21p, a step part 21d (the fourth step part) to accept a later-described annular O-ring (rubber washer, that is, sealing member) is formed. The wall of the step part 2d rises up straight to a given height in the direction of the optical axis OA, forming a rib 21r.

On the other hand, the imaging unit 22 is equipped with a group of lenses 31 consisting of a plurality of lenses (in the present embodiment, six lenses) for wide-angle imaging, a lens barrel 32 to hold the group of lenses 31, and an imaging system 33. The imaging system 33 is located a predetermined distance apart from the last lens of the group of lenses 31. In the present embodiment, although the lens barrel 32 is made of resin material, such as PPA (polyphthalanide), the material of the lens barrel is not limited to the resin.

The group of lenses 31 has a front lens (the first lens) 31a located at the front nearest to an object and a group of remaining lenses 31b. The remaining lenses 31b consist of a second to sixth lenses positioning in turn after the front lens 31a in the direction of an optical axis OA of the lenses. Each lens is formed with glass or plastics material. With these two or more lenses, as shown in FIG. 11, an imaging view of a wide-angle θ is secured.

In order to support all the lenses of the group of lenses 31 optically aligned in turn in the direction of the optical axis OA, a lens-containing space CS is drilled in the lens barrel 32 so that the space changes in steps from its front surface.

Along a circumferential front end of the lens-containing space CS of the lens barrel 32, an annular protrusion 32a is formed to fix the position of the front lens 31a by thermal welding. At the tip of the lens-containing space CS, which positions at the root of the tip, the front lens 31a is disposed, as shown in FIG. 11. In contrast, on an outer cylindrical surface of tip of the lens barrel 32, a step part 32b (the third step part) to accept the foregoing O-ring 25 is formed.

Further, on a cylindrical side surface intersecting perpendicularly the radial direction, a step part D (the first step part) is formed. On an inner wall cylindrical surface of the lens-containing space CS, which faces the step part D, a step part 32c (the second step part) is formed. An annular O-ring 34 (rubber washer, i.e., sealing member) is inserted between both of the step parts D and 32c.

The imaging system 33 has, in turn from the side of the lenses 31, a filter 35, containing member 38 including a CCD and being sealed with a sealing glass 36, CCD substrate 39, and power supply substrate 40. A metal pin 41 is attached to the lens barrel 32 in the direction of the optical axis OA by thermal insertion, as shown in FIG. 11. The above-mentioned CCD substrate 39 is supported through nuts 42 by the metal pin 41. The containing member 38 for the CCD37 is supported by the CCD substrate 39. Moreover, the CCD substrate 39 is electrically connected to the power supply substrate 40 through a connector 41. The power supply substrate 40 is supported by the rear case 21b with substrate pressure springs not illustrated. A code 42 is pulled out from the power supply substrate 40 through the rear case 21b. This pulling is made to maintain the sealing performance performed by a sealing member 43.

The waterproof camera thus constructed will be assembled as follows. At first, each lens of the group of lenses 31 is contained in the lens-containing space CS of the lens barrel 32. In this case, the O-ring 34 is inserted between the step part D of the front lens 31a and the step part 32c on tip of the lens barrel 32, before the front lens 31a is attached. Like the foregoing embodiments, this attachment is carried out by caulking the protrusion 32a on tip of the lens barrel 32 in the radial direction with the thermal welding (refer to arrows A).

Subsequently, the CCD substrate 39 is attached to the metal pin 41 with the nuts 42. The optical axis and foci through the group of lenses 31 and the CCD substrate 39 are optically positioned, and the CCD substrate 39 is fixed in an optically positioned state.

The imaging unit 22 is then assembled into the camera case 21. First, the power supply substrate 40 is held with the substrate pressure spring (not shown) fixed to the rear case 21b. The power supply substrate 40 and the CCD substrate 39 are then connected to each other using the connector 41, resulting in that the physical holding force of the connector 41 provisionally fixes the CCD substrate 39.

After this, the O-ring 25 is inserted between the step part 32b on the outer cylindrical surface of tip of the lens barrel 32 and the step part 21d on the front cylindrical surface of the front case 21a. The rib 21r that is inside the front part of the front case 21a is made to contact springs 44 each of which one end is attached to the lens barrel 32. In parallel to this, the rear case 21b is pressed against the rear-end surface of the front case 21a through the sealing washer 23. Under this pressed state, the front case 21a and the rear case 21b are fixed to each other with the screws 24.

Thereby, the front lens 31a is exposed from the opening 21p of the front of the camera case 21, and the sealing of the opening 21p to the front lens 31a is carried out air-tightly. Therefore, the whole imaging unit 22 is accommodated and supported in an air-tightly sealed inside the camera case 21. Moreover, the compact waterproof camera with a comparatively simplified structure can be offered.

The front lens 31a, which composes part of the front case 21a, is attached to the front case 21a in such a manner that it extends from the surface slightly. Therefore, a wide angle of view for the group of lenses 31 for wide-angle imaging is secured.

Moreover, the group of lenses 31 is arranged within the lens barrel 32. Hence, separately from the camera case 21, the optical properties of the group of lenses 31 can be specified, securing a higher optical capability with ease.

In this waterproof camera, in particular, caulking the protrusion 32a of the lens barrel 32 allows the front lens 31a to be fixed to the lens barrel 32. Under the caulking, the O-ring 34 is compressed in the radial direction so as to accomplish airtight sealing between the front lens 31a and lens barrel 32. That is, the sealing is done on the cylindrical-surface-based fitting structure. A thrust force caused by the caulking is directed in the radial direction. Since a predetermined amount of strength is given the front lens 31a, the front lens 31 a receives this thrust force without any deformations. As a result, pressure to fix the front lens 31a in the direction of the optical axis OA is avoided. In addition, the caulking can be performed with comparatively small force that is enough for fixing the front lens 31a.

The sealing between the lens barrel 32 and the front case 21a is also made with the O-ring 24 on the basis of the cylindrical-surface-based fitting structure. This sealing avoids most stress from being generated in the direction of the optical axis OA.

As described, the sealing structures based on the O-rings 34 and 25 at the two places, both of which involve the lens barrel 32, are provided on the cylindrical-surface-based fitting structure. Hence, the compressed O-rings hardly generate stress in the direction of the optical axis OA, which is more advantageous as compared with the sealing structures described in the foregoing various embodiments. Specifically, the situation where the stress caused with the caulking is transmitted to the CCD substrate 39 through the lens barrel 32 can be avoided almost certainly. There is therefore caused no distortion that extends the CCD substrate 39, for example, in the radial direction. As a result, degradation in image quality that might be caused by distortion of the CCD substrate 39 can be prevented, providing the waterproof camera capable of photographing images of higher quality.

As explained above, the waterproof camera can be avoided from being complicated in its internal structure, be made compact as a whole, and offer a wide range of view to the lens system. For this reason, even when the waterproof camera is used as an on-vehicle monitoring camera or industrial camera endurable outdoors or indoors with much moisture, the camera is stable in performance and is able to offer a long-life imaging function. Particularly, a range of view is wide, so that the camera is useful as a waterproof type of wide-angle camera.

The present invention is not limited to the waterproof structure of each embodiment mentioned above, and can be carried out in further various modes within the gist of the present invention indicated by the appended claims.

What we claim is:

1. A waterproof camera comprising:
    a sealing camera case having a front opening formed at a front thereof;
    a group of lenses for wide-angle viewing, the lenses including a first lens placed at a frontmost position of the group and one or more remaining lenses, the first lens having a convex outer surface; and
    a lens barrel fixed in the camera case,
    wherein the first lens is disposed at the front opening of the camera case so as to seal the front opening and to allow the convex outer surface to extend outside the front of the camera case and the remaining lenses are fixedly contained in the lens barrel.

2. The waterproof camera of claim 1, wherein one end of the lens barrel is integrated with an inner circumferential edge of the front opening of the camera case.

3. A waterproof camera comprising:
    a sealing camera case having a front opening formed at a front thereof;
    a group of lenses for wide-angle viewing, the lenses including a first lens placed at a frontmost position of the group and one or more remaining lenses, the first lens having a convex outer surface; and
    a lens barrel having one circumferential end in a longitudinal direction of the lens barrel, the end forming a further front opening,
    wherein the lens barrel is contained in the camera case so that the end of the lens barrel seals the front opening of the camera case, the first lens is disposed at the further front opening of the lens barrel so as to seal the further front opening and to allow the convex outer surface to extend outside the front of the camera case, and the remaining lenses are fixedly contained within the lens barrel.

4. The waterproof camera of claim 3, wherein the camera case is divided into a front case and a rear case and a boss is formed on each of the rear case and the lens barrel in an optical axis direction of the lenses,
    wherein both of the front case and the rear case are fastened to each other with a sealing member inserted between the front case and the lens barrel and the bosses of both of the rear case and the lens barrel abut one another.

5. The waterproof camera of claim 3, wherein the camera case is divided into a front case and a rear case and a boss is formed on each of the rear case and the lens barrel in an optical axis direction of the lenses,
    wherein both the front case and the rear case are fastened to each other with a sealing member inserted between the front case and the first lens and the bosses of both of the rear case and the lens barrel abut one another.

6. The waterproof camera of claim 3, wherein a sealing member is inserted between the camera case and the first lens and the lens barrel is screwed on an inside of the camera case.

7. A waterproof camera comprising:
    a sealing camera case at a front of which a first opening is formed;
    a lens barrel being fixed within the camera case and having a second opening formed at one cylindrical end located in an axial direction of the lens barrel; and
    a group of lenses disposed in the lens barrel and composed of a plurality of lenses consisting of a first lens placed at a frontmost position of the group and one or more remaining lenses aligning in the axial direction, the first lens having a convex outer surface, wherein the first lens is disposed at the second opening so as to seal the second opening and to allow the convex outer surface of the first lens to extend outside the front of the camera case so as to provide wide-angle viewing, the one cylindrical end of the second opening is subjected to sealing with a ring-like periphery of the convex outer surface of the first lens.

8. The waterproof camera of claim 7, wherein the first lens has a circumferential side surface intersecting with a radial direction of the first lens and a first step part presenting a step-like change in cross section in the axial direction, the lens barrel has a second step part presenting a step-like change in section in the axial direction, and a sealing member is disposed in the radial direction between the first and second step parts.

9. The waterproof camera of claim 8, wherein the lens barrel has a third step part presenting a step-like change in section in the axial direction, the third step part being formed on an outer circumferential surface of one axial end of the lens barrel, the camera case has a fourth step part presenting a step-like change in section in the axial direction, the fourth step part being formed on an inner circumferential surface of a wall forming the first opening of the camera case, and a further sealing member is disposed in the radial direction between the third and fourth step parts.

10. The waterproof camera of claim 7, wherein the lens barrel is made of resin and the one cylindrical end includes a ring-like protrusion extending therefrom, wherein the protrusion is caulked by thermal welding so that the protrusion covers the ring-like periphery of the convex outer surface of the first lens.

11. A waterproof camera comprising:

a sealing camera case formed to have a front at which an opening is formed;

a lens barrel formed to have one axial cylindrical end and disposed within the camera case so that the one axial cylindrical end is disposed at the opening in a sealed state; and a group of lenses supported by the lens barrel and composed of a plurality of lenses including a first lens located at a frontmost position and one or more remaining lenses, the first lens being formed to have a convex outer surface and supported in a sealed state at the one axial cylindrical end of the lens barrel so that the convex outer surface of the first lens is located outside the front of the camera case.

* * * * *